(12) United States Patent
Cini et al.

(10) Patent No.: US 7,966,828 B2
(45) Date of Patent: Jun. 28, 2011

(54) VARIABLE AREA NOZZLE WITH WOVEN SLEEVE EXTENSION

(75) Inventors: Colin L. Cini, Vernon, CT (US); Kenneth C. Baran, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 1207 days.

(21) Appl. No.: 11/650,709

(22) Filed: Jan. 8, 2007

(65) Prior Publication Data

US 2008/0163606 A1 Jul. 10, 2008

(51) Int. Cl.
*F02K 1/00* (2006.01)
*F02K 3/02* (2006.01)
*F02K 1/54* (2006.01)
*B64C 15/00* (2006.01)

(52) U.S. Cl. ............. 60/771; 60/770; 60/226.2; 60/230; 239/265.19; 244/110 B

(58) Field of Classification Search ............ 60/232, 60/226.3, 262, 263, 770, 771, 226.1, 226.2, 60/230; 239/265.17, 265.29, 265.19; 181/213, 220; 244/110 B See application file for complete search history.

(56) References Cited

U.S. PATENT DOCUMENTS

| | | | | |
|---|---|---|---|---|
| 5,343,696 A * | 9/1994 | Rohra et al. | ................. | 60/226.2 |
| 5,721,402 A * | 2/1998 | Parente | ......................... | 181/214 |
| 5,794,434 A * | 8/1998 | Szupkay | ...................... | 60/226.2 |
| 5,806,302 A * | 9/1998 | Cariola et al. | .................. | 60/204 |
| 6,663,042 B2 * | 12/2003 | Hatrick et al. | ............ | 244/110 B |

* cited by examiner

*Primary Examiner* — Michael Cuff
*Assistant Examiner* — Young Choi
(74) *Attorney, Agent, or Firm* — Carlson, Gaskey & Olds, PC

(57) ABSTRACT

A variable area fan nozzle for use with a gas turbine engine system includes a nozzle section that is attachable to a gas turbine engine for influencing flow through the fan bypass passage of the gas turbine engine. The nozzle section is movable between a first length and a second length that is larger than the first length to influence the flow. For example, the nozzle section includes members that are woven together to form collapsible openings that are open when the nozzle section is moved to the first length and that are closed when the nozzle section is moved to the second length.

27 Claims, 3 Drawing Sheets

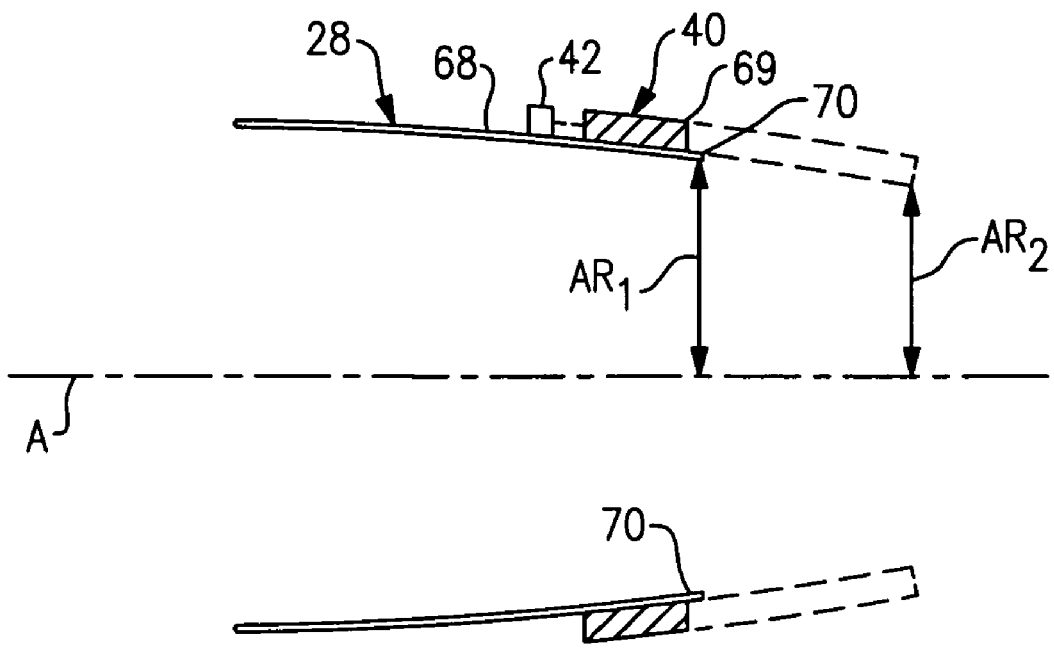
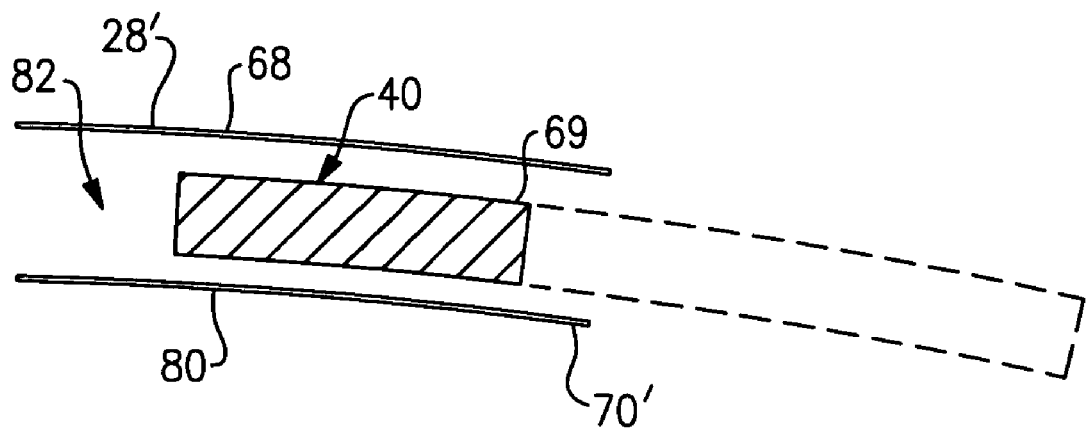
FIG.5

VARIABLE AREA NOZZLE WITH WOVEN SLEEVE EXTENSION

BACKGROUND OF THE INVENTION

This invention relates to gas turbine engines and, more particularly, to a gas turbine engine having a variable fan nozzle for controlling a bypass airflow through a fan bypass passage of the gas turbine engine.

Gas turbine engines are widely known and used for vehicle (e.g., aircraft) propulsion. A typical gas turbine engine includes a core comprising a compression section, a combustion section, and a turbine section that utilize a core airflow to propel the vehicle. The gas turbine engine is typically mounted within a housing, such as a nacelle. A bypass airflow flows through an annular passage between the housing and the core and exits from the engine at an outlet.

Presently, conventional gas turbine engines are designed to operate within a desired performance envelope under certain predetermined flight conditions, such as cruise. Conventional engines tend to approach or exceed the boundaries of the desired performance envelope under flight conditions outside of cruise, such as take-off and landing, which may undesirably lead to less efficient engine operation. For example, the size of the fan and the ratio of the bypass airflow to the core airflow are designed to maintain a desired pressure ratio across the fan during take-off to prevent choking of the bypass flow in the passage. However, during cruise, the bypass flow is reduced in the passage and the fuel burn of the engine is negatively impacted. Since engines operate for extended periods of time at cruise, the take-off design constraint exacerbates the fuel burn impact.

Therefore, there is a need to control the bypass airflow over a wider variety of different flight conditions to enable enhanced control of engine operation and to reduce fuel burn.

SUMMARY OF THE INVENTION

An example variable area fan nozzle for use with a gas turbine engine system includes a nozzle section that is attachable to the gas turbine engine for influencing flow through a fan bypass passage of the gas turbine engine. The nozzle section is movable between a first length and a second length that is greater than the first length to influence the flow. For example, the nozzle section includes members that are woven together to form collapsible openings therebetween that are open when a nozzle section is moved to the first length and that are closed when the nozzle section is moved to the second length.

In another aspect, a gas turbine engine system incorporates the example variable area fan nozzle. For example, the nozzle section is attached to an aft end of the nacelle of the gas turbine engine.

An example method for controlling the gas turbine engine system using the nozzle includes the steps of selectively moving the nozzle between the first length and the second length to control the bypass airflow of the fan bypass passage. For example, the nozzle section is moved between the first length and the second length to selectively open and close the collapsible openings in the nozzle to change an effective area of the nozzle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 4 illustrates an example nozzle section that is mounted on an outside of a nacelle of a gas turbine engine.

FIG. 5 illustrates an example nozzle section that is mounted within a nacelle of a gas turbine engine.

DETAILED DESCRIPTION OF THE PREFERRED EMBODIMENT

Figure 1:
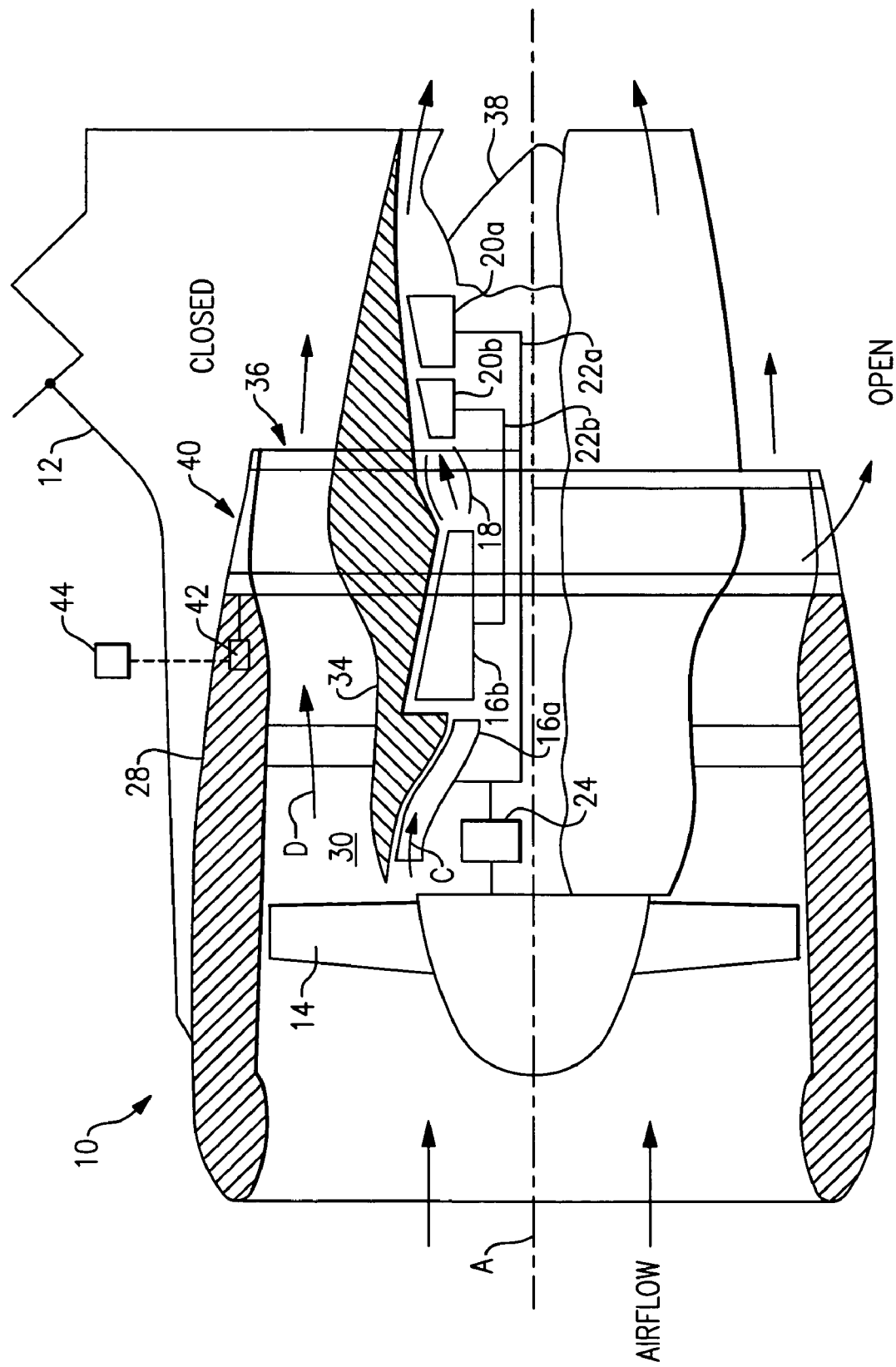
FIG. 1 illustrates selected portions of an example gas turbine engine system having a variable area fan nozzle.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a high pressure turbine 20b, and a low pressure turbine 20a. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22a and 22b (e.g., spools) to rotationally drive the compressors 16a, 16b and the fan 14 in response to the expansion. In this example, the rotor 22a also drives the fan 14 through a gear train 24.

In the example shown, the gas turbine engine 10 is a high bypass turbofan arrangement. For example, the bypass ratio is greater than 10:1, and the fan 14 diameter is substantially larger than the diameter of the low pressure compressor 16a. The low pressure turbine 20a has a pressure ratio that is greater than 5:1, in one example. The gear train 24 can be any known gear system, such as a planetary gear system with orbiting planet gears, planetary system with non-orbiting planet gears, or other type of gear system. In the disclosed example, the gear train 24 reduces the speed of fan 14 in relation to the rotor 22a. Given this description, one of ordinary skill in the art will recognize that the above parameters are only exemplary and that other parameters may be used to meet the particular needs of an implementation.

An outer housing, nacelle 28, (also commonly referred to as a fan nacelle or fan cowl) extends circumferentially about the fan 14. An annular fan bypass passage 30 extends between the nacelle 28 and an inner housing, inner cowl 34, which generally surrounds the compressors 16a, 16b, turbines 20a, 20b, and combustor section 18.

In operation, the fan 14 draws air into the gas turbine engine 10 as a core flow, C, and into the bypass passage 30 as a bypass air flow, D. A rear exhaust 36 discharges the bypass air flow D from the gas turbine engine 10. The core flow C is discharged from a passage between the inner cowl 34 and a tail cone 38.

The example gas turbine engine 10 shown FIG. 1 also includes a nozzle 40 (shown schematically) associated with the bypass passage 30. The nozzle 40 is shown near the trailing end of the nacelle 28, as an exhaust or exit nozzle. However, the nozzle 40 need not be an exhaust/exit nozzle. For example the functions and mechanical arrangement of the nozzle 40, as will be described, may be integrated into the nacelle 28 at any axial location aft of the fan 14.

The nozzle 40 is operatively connected with actuators 42 for movement between a plurality of positions to influence the bypass air flow D, such as to manipulate an air pressure of the bypass air flow D. A controller 44 commands the actuators 42 to selectively move the nozzle 40 along an axial path to manipulate the bypass air flow D in a desired manner. The controller 44 may be dedicated to controlling the actuators 42 and nozzle 40, integrated into an existing engine controller within the gas turbine engine 10, or be incorporated with other known aircraft or engine controls. For example, selective movement of the nozzle 40 permits the controller 44 to vary the amount of thrust provided, enhance conditions for aircraft control, enhance conditions for operation of the fan 14, or enhance conditions for operation of other components associated with the bypass passage 30, depending on input parameters into the controller 44.

In the illustrated example, the controller 44 selectively commands the actuators 42 to move the nozzle 40 in response to one of a plurality of operational states of the gas turbine engine 10. For example, the plurality of operational states includes a first operational state associated with an aircraft cruise condition and a second operational state associated with an aircraft landing condition. Generally, the aircraft cruise condition comprises relatively constant aircraft air speed at a relatively constant altitude. It is to be understood that other operational states may also benefit from using the nozzle 40. For example, the nozzle 40 may be used during ground maneuvers to provide enhanced maneuvering control.

The gas turbine engine 10 is designed to operate within a desired performance envelope under certain predetermined conditions, such as cruise. For example, the fan 14 is designed for a particular flight condition—typically cruise at approximately 0.8 Mach and 35,000 feet. The fan 14 is designed at a particular fixed stagger angle for an efficient cruise condition. The nozzle 40 is operated to influence the bypass airflow D such that the angle of attack or incidence on the fan 14 is maintained close to design incidence at other flight conditions, such as landing and takeoff, thus enabling a desired engine operation over a range of flight condition with respect to performance and other operational parameters such as noise levels. In one example, it is desirable to operate the fan 14 under a desired pressure ratio range (i.e., the ratio of air pressure forward of the fan 14 to air pressure aft of the fan 14) to avoid fan flutter. To maintain this range, the nozzle 40 is used to influence the bypass airflow D to control the air pressure aft of the fan 14 and thereby control the pressure ratio. The nozzle varies a cross-sectional area associated with the rear exhaust 36 of the bypass passage 30 by approximately 20% to influence the bypass airflow D, for example.

Figure 3:
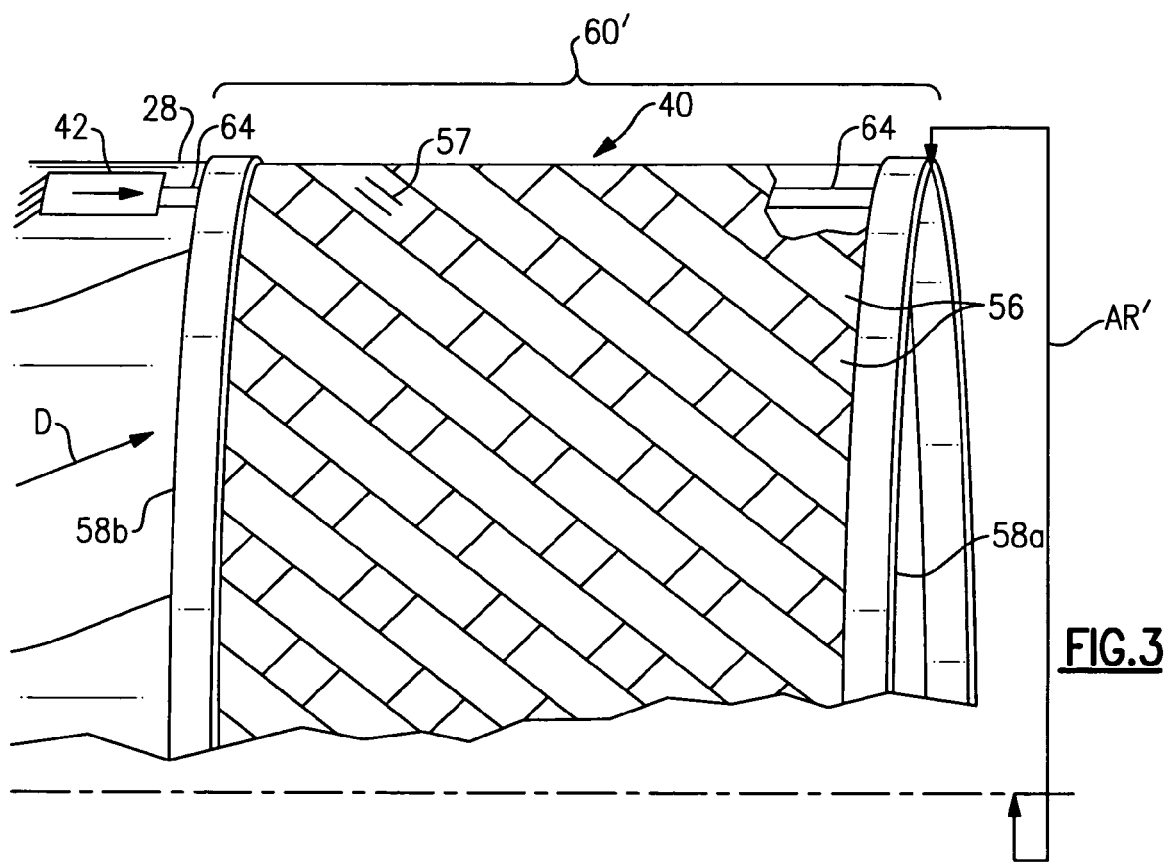
FIG. 3 illustrates the nozzle section in an expanded position.
Figure 2:
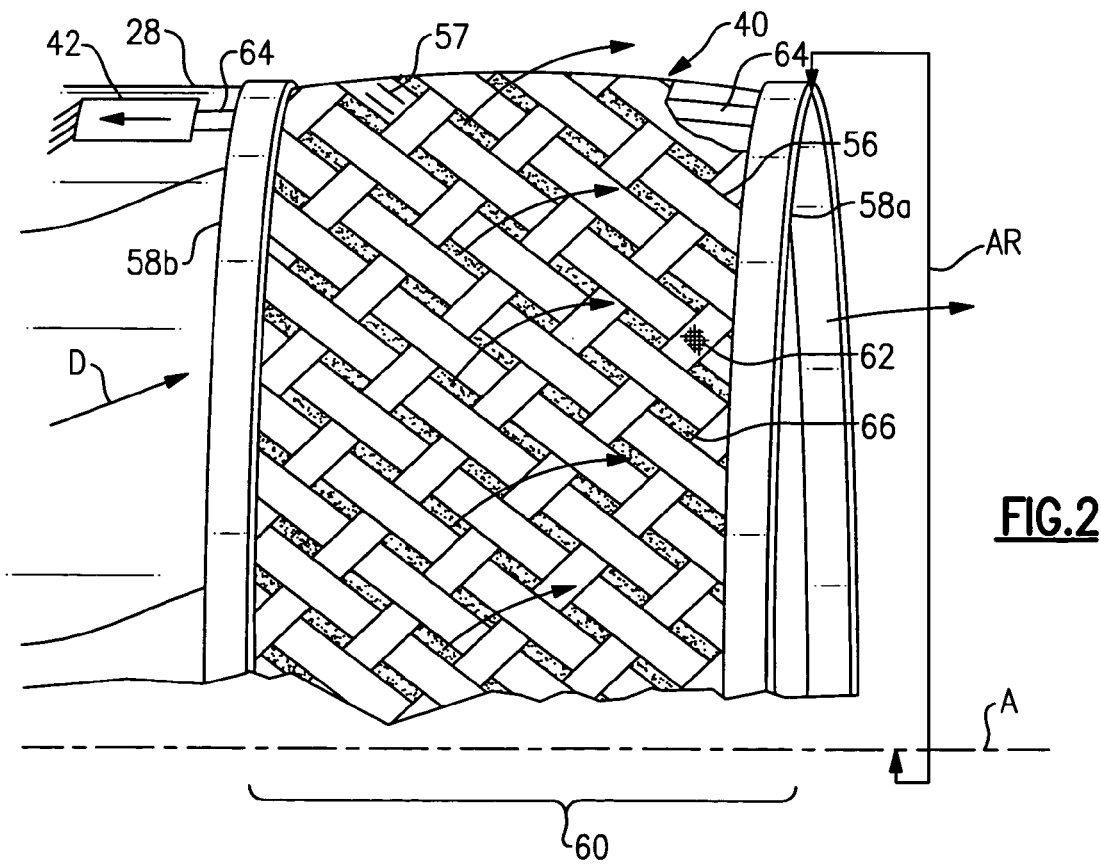
FIG. 2 illustrates an example nozzle section having members that are woven together, wherein the nozzle section is in a compressed position.

Referring to FIGS. 2 and 3, the nozzle 40 includes members 56 that are woven together to form a sleeve. For example, the members 56 may be flexible members such as wires, strands (i.e., bundles of wires or filaments), belts (i.e., wires and/or strands surrounded by a matrix material), or combinations thereof. In another example, the members 56 include fiber reinforcement 57 (shown schematically in a selected area), such as carbon fibers, steel fibers, or other type of reinforcing fiber. The weave pattern may be a simple basket weave pattern as shown in the examples or may be woven in another alternating pattern.

The members 56 are attached at an axially aft end to a support ring 58a and attached at an axially forward end to another support ring 58b. The axially forward and aft ends 58a, 58b define a length 60 (FIG. 2) therebetween.

Optionally, the members 56 include an anti-friction coating 62 (shown schematically in a selected area) on the outside surfaces that facilitates relative movement between the members 56. For example, the anti-friction coating 62 is a polymer sold under the trademark TEFLON by Dupont. The anti-friction coating 62 may also function as a seal, as will be described below.

In the illustrated example, at least the support ring 58a is attached to the actuators 42 by rod 64 (illustrated schematically in a cutaway portion) such that selective movement of the rod 64 moves the support ring 58a axially aft or forward to change the length 60 of the nozzle 40.

As can be appreciated from FIG. 2, in a relatively axially compressed state, there are collapsible openings 66 between the members 56. The collapsible openings 66 provide an auxiliary flow path (i.e., an auxiliary flow area) for the bypass airflow D to effectively augment a cross-sectional area AR of the nozzle 40. The actuator 42 selectively moves the support ring 58a in an axially aft direction to length 60' (FIG. 3) that is greater than the length 60 illustrated in FIG. 2. In this relatively axially expanded state, the members 56 are drawn together such that the collapsible openings 66 are closed. Thus, extension of the nozzle 40 restricts, and in the limit substantially prevents, the bypass airflow D from flowing through the collapsible openings 66, which have been closed down, to effectively reduce the auxiliary flow area of the nozzle 40.

Additionally, relative axial expansion and contraction of the nozzle 40 may change a cross-sectional area as represented by the radial distance AR between the central axis A and the aft support ring 58a. For example, moving the nozzle 40 to the axially compressed position (FIG. 2) may result in a relatively larger cross-sectional area AR. Conversely, moving the nozzle 40 to the axially expanded position (FIG. 3) may result in a relatively smaller flow cross-sectional area AR'. Thus, the illustrated example nozzle 40 provides the benefit of dual control over the bypass airflow D due to auxiliary flow of the bypass airflow D through the auxiliary area attributable to the collapsible openings 66 and axial flow through the cross-sectional area AR or AR'.

For example, moving the nozzle 40 to an axially extended position (FIG. 3) for a relatively smaller total flow area (the sum of the auxiliary flow area and the cross-sectional area AR or AR') restricts the bypass airflow D and produces a pressure build-up (i.e., an increase in air pressure) within the bypass passage 30. Moving the nozzle 40 to an axially compressed position (FIG. 2) for a relatively greater total flow area permits more bypass airflow D through the collapsible openings 66 and reduces the pressure build-up (i.e., a decrease in air pressure).

Thus, the controller 44 can selectively control the air pressure within the bypass passage 30 to thereby control the pressure ratio across the fan 14 as described above. For example, during take-off, the nozzle 40 is opened to achieve a desired pressure ratio that permits the fan 14 to avoid a flutter condition, prevent choking and thereby operate more efficiently.

In one example, the anti-friction coating 62 also functions as a seal between the members 56 to prevent or resist flow through the collapsible openings 66 when the members 56 are drawn together.

FIG. 4 schematically illustrates an example wherein the nozzle 40 (similar to that illustrated in FIGS. 2 and 3) is mounted on a radially outer surface 68 of the nacelle 28. In this example, an aft end 69 of the nozzle 40 is located forward of an aft end 70 of the nacelle 28 when the nozzle 40 is in the axially compressed position. Alternatively, the aft end 69 is aligned axially with the aft end 70. The aft end 69 of the nozzle 40 is located aft of the aft end 70 of the nacelle 28 when the nozzle 40 is in the extended position (shown by the dashed lines). In this example, the compressed position corresponds to the cross-sectional area represented by $AR_1$, and the expanded position corresponds to the cross-sectional area represented by $AR_2$. Since the nozzle 40 is mounted outside of the nacelle 28, there is no auxiliary flow through the collapsible openings 66 in the axially retracted position. The controller 44 and actuator 42 selectively extend or retract the nozzle 40 to change the cross-sectional area, as described above.

FIG. 5 illustrates an example in which the nozzle 40 is stowed within the nacelle 28' instead of being mounted outside of the nacelle 28. In this example, the nacelle 28' includes the radially outer surface 68 and a radially inner surface 80 that define a space 82 therebetween. The nozzle 40 is stowed within the space 82 such that in the compressed position, the aft end 69 of the nozzle 40 is located forward of the aft end 70' of the nacelle 28', and in the axially expanded position (shown by dashed lines) the aft end 69 of the nozzle 40 is located aft of the aft end 70' of the nacelle 28'. Similar to the example of FIG. 4, there is no auxiliary flow through the collapsible openings 66 in the axially retracted position because the nozzle is within the nacelle 28'.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine system comprising:
a nacelle;
a gas turbine engine within the nacelle;
a fan bypass passage between the nacelle and the gas turbine engine;
a nozzle section comprising members that are woven together and comprising gaps between said members that are woven together, wherein said gaps are closed when said nozzle section is a first axial length and open when said nozzle section is a second axial length wherein the nozzle section is associated with the fan bypass passage to influence flow through the fan bypass passage, wherein the nozzle section is selectively adjustable along a central axis between the first axial length and the second axial length that is larger than the first axial length to influence the flow; and
a controller for selectively moving the nozzle section responsive to one of a plurality of operational states of the gas turbine engine.

2. The gas turbine engine system as recited in claim 1, wherein the nozzle section is attached to an aft end of the nacelle.

3. The gas turbine engine system as recited in claim 1, wherein the nozzle section is attached to a radially outer surface of the nacelle relative to a central axis of the gas turbine engine.

4. The gas turbine engine system as recited in claim 1, wherein the nozzle section is stowed at least partially within an aft end of the nacelle.

5. The gas turbine engine system as recited in claim 1, wherein the nozzle section includes an aft end that is located axially aft of an aft end of the nacelle when the nozzle section is moved to the second length and that is located axially forward of or axially aligned with the aft end of the nacelle when the nozzle section is moved to the first length.

6. The gas turbine engine system as recited in claim 1, further comprising an actuator that moves the nozzle section responsive to commands from the controller.

7. The gas turbine engine system as recited in claim 1, wherein said nozzle section further comprises a first end attached to an aft end of the nacelle and a second end opposite said first end, wherein said second end is movable between a first position when said nozzle section is the first length and the second position when said nozzle section is a second length, and wherein said first end is in a fixed position when said nozzle section is the first length and when said nozzle section is the second length.

8. A method for controlling a gas turbine engine system having a nozzle section that is associated with a bypass air flow of a fan bypass passage, wherein the nozzle section comprises members that are woven together, and further comprises gaps between said members, wherein said gaps are closed when said nozzle section is a first axial length and open when said nozzle section is a second axial length comprising:
selectively moving the nozzle section between a first length and a second length that is greater than the first length to control the bypass air flow of the fan bypass passage.

9. The method as recited in claim 8, including moving the nozzle section between the first length and the second length to selectively open and close collapsible openings in the nozzle to control an effective area of the fan bypass passage.

10. The method as recited in claim 8, including moving the nozzle section from the second length to the first length to open collapsible openings in the nozzle such that an effective area of the fan bypass passage increases.

11. The method as recited in claim 8, including moving the nozzle section from the first length to the second length to close the collapsible openings in the nozzle such that an effective area of the fan bypass passage decreases.

12. The method as recited in claim 8, including moving the nozzle section from the second length to the first length such that a cross-sectional area of the fan bypass passage increases.

13. The method as recited in claim 8, including moving the nozzle section from the first length to the second length such that a cross-sectional area of the fan bypass passage decreases.

14. The method as recited in claim 8, wherein step of selectively moving said nozzle section between a first length and a second length comprises maintaining a position of a first end of the nozzle section and moving a second end of the nozzle section relative to the first end.

15. A variable area fan nozzle for use with a gas turbine engine system comprising:
a nozzle section having members that are woven together and gaps between said members, said gaps being closed when said nozzle section is a first length and open when said nozzle section is a second length, and having a first end that is attachable to a gas turbine engine and a second end axially opposite said first end, for influencing flow through a fan bypass passage of the gas turbine engine, wherein the second end of the nozzle section is moveable relative to the first end, such that the axial length of the nozzle section is adjustable between the first length and the second length that is greater than the first length to influence the flow.

16. The variable area fan nozzle as recited in claim 15, wherein the nozzle section includes a forward end and an aft end that define therebetween the first length and the second length.

17. The variable area fan nozzle as recited in claim 15, wherein the members comprise wires, strands, belts, or combinations thereof.

18. The variable area fan nozzle as recited in claim 15, wherein the members comprise a composite material having fibers selected from carbon or steel fibers.

19. The variable area fan nozzle as recited in claim 15, wherein the members comprise an anti-friction coating.

20. The variable area fan nozzle as recited in claim 15, wherein the members are flexible.

21. The variable area fan nozzle as recited in claim 15, wherein the nozzle section includes collapsible openings that are in an open position when the nozzle section is moved to the first length and are in a closed position when the nozzle section is moved to the second length.

22. The variable area fan nozzle as recited in claim 21, wherein the nozzle section comprises a seal to resist flow through the collapsible openings when the collapsible openings are in the closed position.

23. The variable area fan nozzle as recited in claim 21, wherein each of said collapsible openings comprises a gap between strands of a woven material.

24. The variable area fan nozzle as recited in claim 15, wherein the nozzle section comprises a sleeve.

25. The variable area fan nozzle as recited in claim 24, wherein the nozzle section comprises a first support ring on a front end of the annular sleeve and a second support ring on an aft end of the annular sleeve.

26. The variable area fan nozzle as recited in claim 15, wherein said nozzle section comprises a first end attached to said gas turbine engine and a second end, opposite said first end, wherein said second end is in a first position when said nozzle section is the first length and in a second position when said nozzle section is the second length, and wherein said first end is in a single position when said nozzle section is the first length and when said nozzle section is the second length.

27. The variable area fan nozzle as recited in claim 26, wherein said first end comprises a first support ring and said second end comprises a second support ring.

* * * * *